(12) United States Patent
Bellasalma et al.

(10) Patent No.: US 6,536,936 B1
(45) Date of Patent: Mar. 25, 2003

(54) MIX HEAD ASSEMBLY FOR A MOLDING MATERIAL DELIVERY SYSTEM

(75) Inventors: Gerard Jay Bellasalma, Yorba Linda, CA (US); Joon Taek Kim, West Hollywood, CA (US)

(73) Assignee: Masco Corporation, Taylor, MI (US)

( * ) Notice: Subject to any disclaimer, the term of this patent is extended or adjusted under 35 U.S.C. 154(b) by 0 days.

(21) Appl. No.: 09/662,662

(22) Filed: Sep. 15, 2000

(51) Int. Cl.$^7$ .............................. B01F 7/06; B01F 15/02
(52) U.S. Cl. ................. 366/138; 366/172.1; 366/182.4; 366/327.3; 366/328.2; 366/328.3; 422/135
(58) Field of Search ............................... 366/172.1, 194, 366/327.3, 138, 182.4, 328.2, 328.3, 328.4; 425/207, 208, 209, 200; 422/135, 133, 225, 226

(56) References Cited

U.S. PATENT DOCUMENTS

| | | | |
|---|---|---|---|
| 3,207,486 A | * | 9/1965 | Rosenthal |
| 3,406,429 A | | 10/1968 | Draudt et al. |
| 3,608,870 A | * | 9/1971 | Albridge |
| 3,709,664 A | * | 1/1973 | Krekeler et al. |
| 3,776,525 A | * | 12/1973 | Warner |
| 4,141,470 A | | 2/1979 | Schulte et al. |
| 4,332,335 A | | 6/1982 | Fiorentini |
| 4,379,122 A | | 4/1983 | Taubenmann |
| 4,773,564 A | | 9/1988 | Wallner |
| 4,834,545 A | | 5/1989 | Inoue et al. |
| 4,856,908 A | | 8/1989 | Hara et al. |
| 5,151,288 A | * | 9/1992 | Curry et al. |
| 5,277,567 A | | 1/1994 | Bauer et al. |
| 5,498,151 A | | 3/1996 | Nennecker |
| 5,564,827 A | | 10/1996 | Signer |
| 6,183,560 B1 | * | 2/2001 | Sarrasin |

* cited by examiner

Primary Examiner—Charles E. Cooley
Assistant Examiner—David Sorkin
(74) Attorney, Agent, or Firm—Carlson, Gaskey & Olds (57) ABSTRACT

A mix head assembly for a rapid discharge multiple material delivery molding system includes an output chamber assembly having a plurality of impellers, a main body assembly, and a drive assembly. The main body assembly preferably includes a plurality of input ports which correspond to the number of fluid material supplies. In one disclosed embodiment, the mix head assembly include a flush assembly to communicate a flushing fluid from a supply through the gates and into the feed chambers to minimize residual fluid material after each molding cycle. In operation, the fluid materials are directed by their respective input ports to a first impeller. The first impeller is driven by the drive shaft such that the impeller drives the fluid materials back toward the input ports. The pressure in the material builds up and it eventually is driven back past the first impeller. Highly effective mixing of the fluid materials is provided as the fluid materials are driven back into the streams of fluid materials from the input ports. The next impeller which the fluid material flow encounters preferably has an opposite pitch such that the second impeller drives the fluid material toward a third impeller. Sequentially alternating between this "with stream" and "against stream" impeller drive orientation preferably continues until the final impeller drives the fluid materials out through a first chamber portion where dividers provide a final fluid material flow disturbance as the fluid material is directed to the mold assembly.

29 Claims, 8 Drawing Sheets

MIX HEAD ASSEMBLY FOR A MOLDING MATERIAL DELIVERY SYSTEM

BACKGROUND OF THE INVENTION

The present invention relates to a molding machine, and more particularly to a mix head assembly for a molding machine that thoroughly mixes a multiple of fluid material components.

Many molding machines provide for the mixing of at least two fluid materials to form a hardenable or settable mixture which can be discharged into a mold cavity in the formation of an article molded of synthetic resin. One particular mixture includes three components, a catalyst, a matrix polymer and a foaming agent.

The fluid materials are typically fed from a supply by a delivery or feed assembly which communicates with a mixing head. Each fluid material is mixed by the mixing head and discharged into the mold cavity to form the molded article.

SUMMARY OF THE INVENTION

An important aspect of the molding process is the thoroughness of mixture of each fluid material in the mixing head during each cycle of the molding machine. Each fluid material must be efficiently mixed at the mix head to assure homogenous composition of the finished material. It is also desirable to provide a flushing assembly within the mix head to minimize the possibility of fluid material components remaining and curing within the mix head.

A mix head assembly according to the present invention generally includes an output chamber assembly, a main body assembly, and a drive assembly. The main body assembly preferably includes a plurality of inlet ports which correspond to the number of fluid material supplies. The fluid material from each fluid material supply is received through the input ports, thoroughly mixed within the mix head assembly, and output through the output chamber assembly into a mold assembly.

The drive assembly includes a drive motor which rotatably drives a main shaft which propels a plurality of impellers. The impellers preferably rotate within a secondary chamber and a tertiary chamber.

Each inlet port includes a moveable gate to open and close fluid material flow through the input ports. The gates are preferably mounted to a retaining block. A flush actuator plate is mounted to a flush push plate by a plurality of flush actuator rods. The flush actuator rods remotely drive the flush actuator plate along a main axis of the mix head assembly. The retaining block drives the gates within respective feed chambers of to selectively provide or prevent communication from each inlet port to the output chamber assembly and impellers.

In one disclosed embodiment the mix head assembly include a flush assembly to communicate a flushing fluid from a supply through the gates and into the feed chambers to minimize residual fluid material after each molding cycle. A flush input communicates with a flush bore located axially through the gate. A flush pin is movably located within the flush bore such that the flush pin selectively provide or prevents communication from the flush input into the feed chamber.

In operation, a plurality of flush actuator rods remotely drive a flush actuator plate toward the retaining block. As the flush actuator plate is driven toward the retaining block, the flush actuator plate overcomes a biasing member such that the flush pin extends from the head of the gate. The flush bore opens to the feed chamber and a complete communication path for a flushing fluid or the like is thereby created from the flush inlet, through the flush bore, and into the feed chamber. Although the flush fluid path is preferably opened in response to operation of the flush actuator plate, it will be realized that the flushing fluid can be selectively injected into the flush input under control of a controller.

Further movement of the flush actuator rods, remotely drives the flush actuator plate against the retaining block. The retaining block and gates are thereby driven as a complete unit such that the gates selectively block the feed chamber. As each gate is fixed in the retaining block, the gates operate in unison such that that the inlet ports are opened and closed substantially simultaneously.

As the fluid material from each fluid material supply exit the respective feed chambers, the fluid materials encounter a first impeller in the tertiary chamber. Preferably, the first impeller is angled relative to the drive shaft such that the impeller drives the fluid materials back toward the feed chambers. Effective mixing of the fluid materials is thus provided as the fluid materials are driven back into the streams of fluid materials from the feed chambers.

The next impeller which the fluid material flow encounters preferably has an opposite pitch such that the second impeller drives the fluid material toward a third impeller. Sequentially alternating between this "with stream" and "against stream" impeller drive orientation preferably continues until the final impeller drives the fluid materials out through the through a first chamber portion where dividers provide a final fluid material flow disturbance as the fluid material is directed to the mold assembly.

This mix head is particularly advantageous for mixing a material to be injected wherein a polymer matrix carries glass fibers. The applicant of this invention has recently also invented the concept of a coated glass fiber with a coating that prevents the fibers from beginning to react with the other components. To assure the coated fibers react with the other components, the coating is efficiently smashed or cracked in the mixing head by the impellers. The fibers then begin to react.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
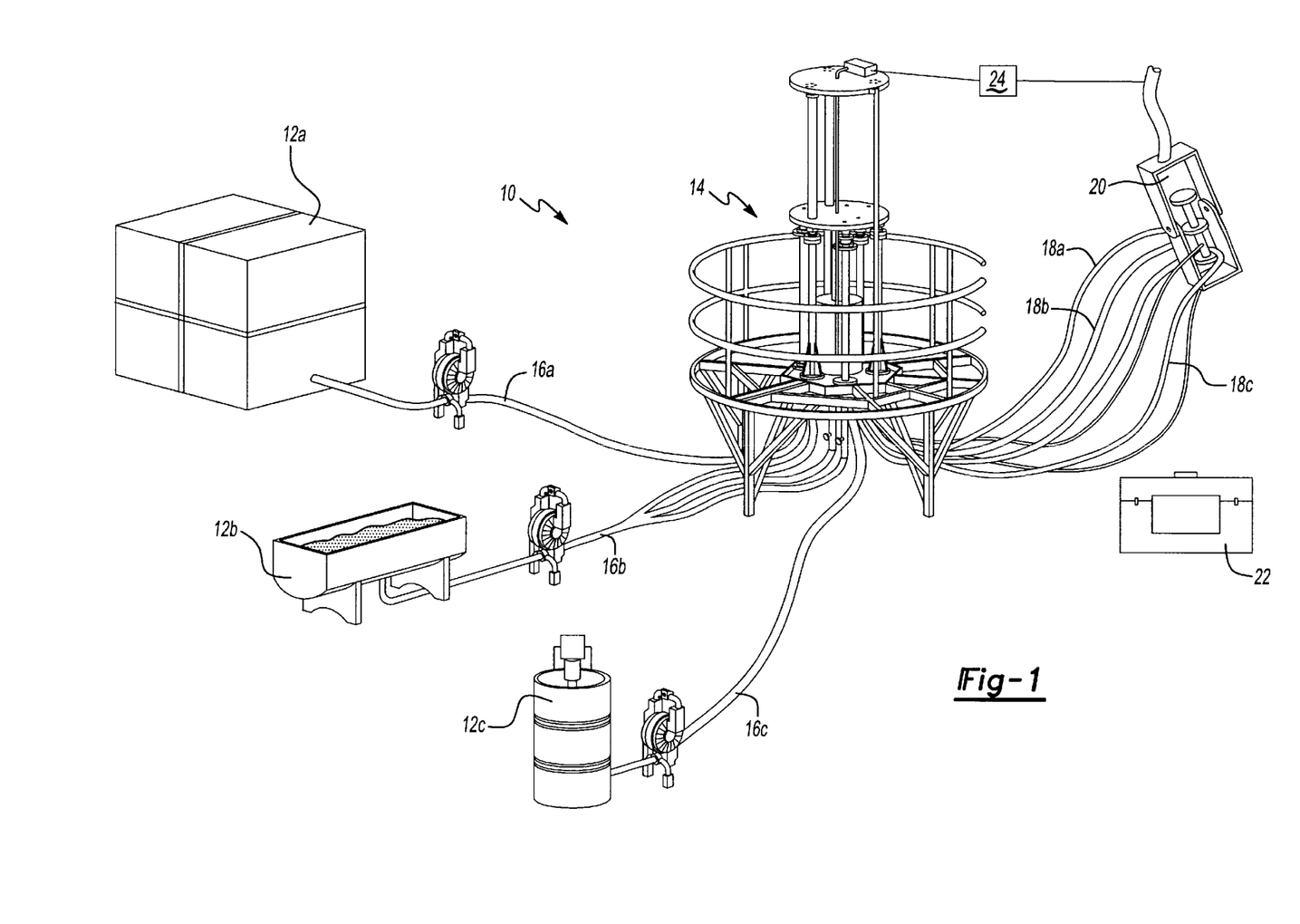
FIG. 1 is a simplified schematic representation of a multiple material molding system.

FIG. 1 schematically illustrates a multiple material molding system 10. The system 10 generally includes a plurality of fluid material supplies 12A, 12B and 12C, which communicate with a feed assembly 14 through respective supply conduits 16A, 16B, 16C. The feed assembly 14 drives a desired quantity of fluid material from each fluid material supply 12A, 12B and 12C through output conduits 18A, 18B and 18C to a mix head assembly 20. The mix head assembly 20 thoroughly mixes the fluid material from each fluid material supply 12A, 12B and 12C and injects the final mixture into a mold assembly 22 or the like. Preferably, a controller 24 communicates with the feed assembly 14 and mix head assembly 20 to assure the system 10 is operating within predefined parameters. Controls for injection-molding equipment are known in the art and further description of the algorithms will not be further detailed herein. System 10 is preferably utilized for injection molding of very large parts, and in particular bath tubs and shower surrounds.

Figure 2:
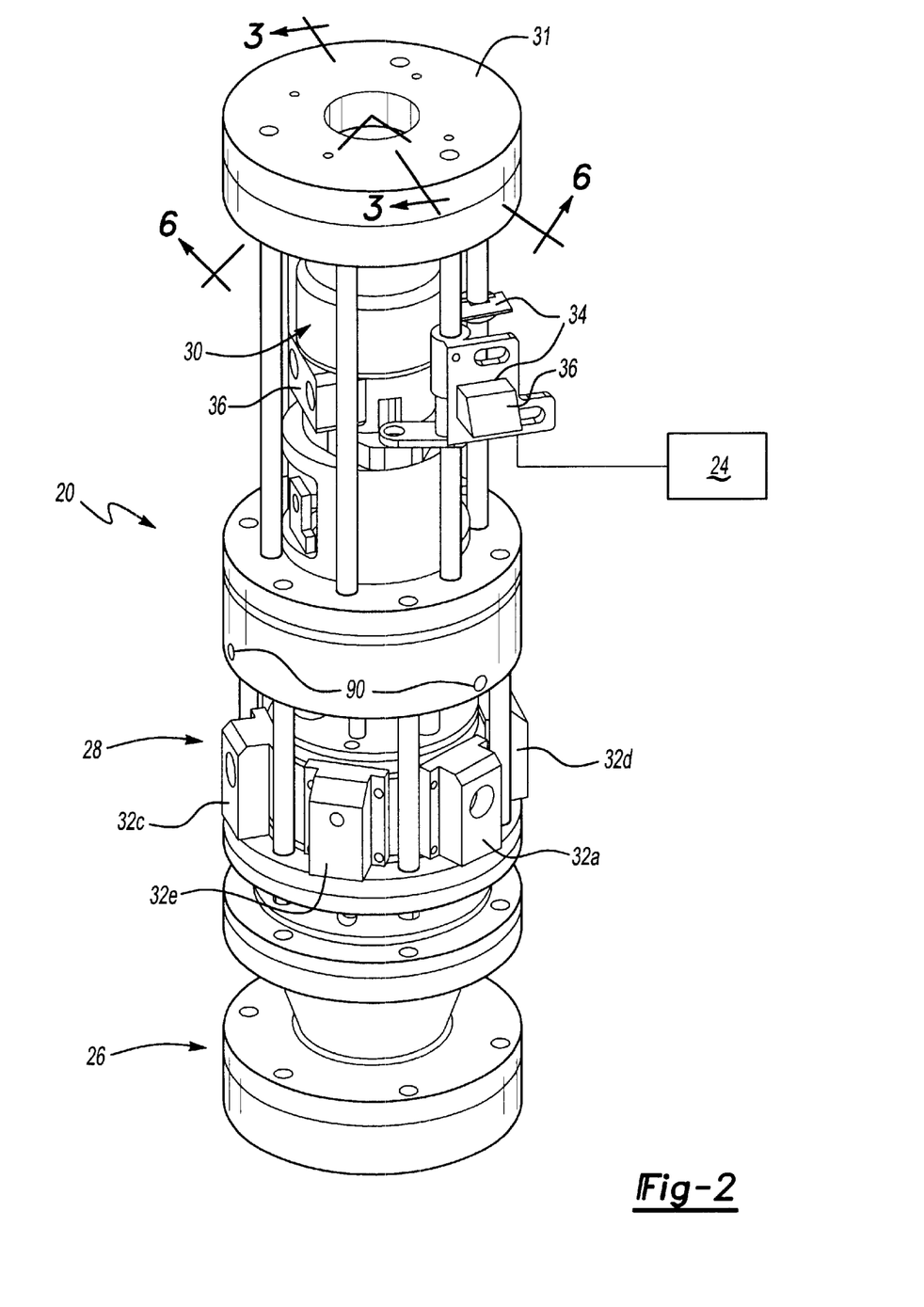
FIG. 2 is a perspective view of a mix head assembly according to the present invention.

Referring to FIG. 2, a perspective view of a mix head assembly 20 according to the present invention is illustrated. The assembly 20 generally includes an output chamber assembly 26 a main body assembly 28, a drive assembly 30 and a mounting plate 31. The main body assembly 28 preferably includes a plurality of inlet ports 32A–32F which correspond to the fluid material supplies 12A, 12B and 12C (FIG. 1). In practice there may be six such ports so that several ports may input the same material, such that the material is injected at circumferentially spaced locations. As will be further described below, the fluid material from each fluid material supply 12A, 12B and 12C is received through the input ports 32A–32F, thoroughly mixed within the mix head assembly 20, and output through the output chamber assembly 26.

A plurality of sensor mounts 34 are preferably attached to the mix head assembly 20 to provide for the mounting of a multiple of sensors 36 such as displacement sensors, proximity sensors, RPM sensors, and the like. The sensors 36 preferably communicate with the encoder and controller 24 (FIG. 1).

Figure 3:
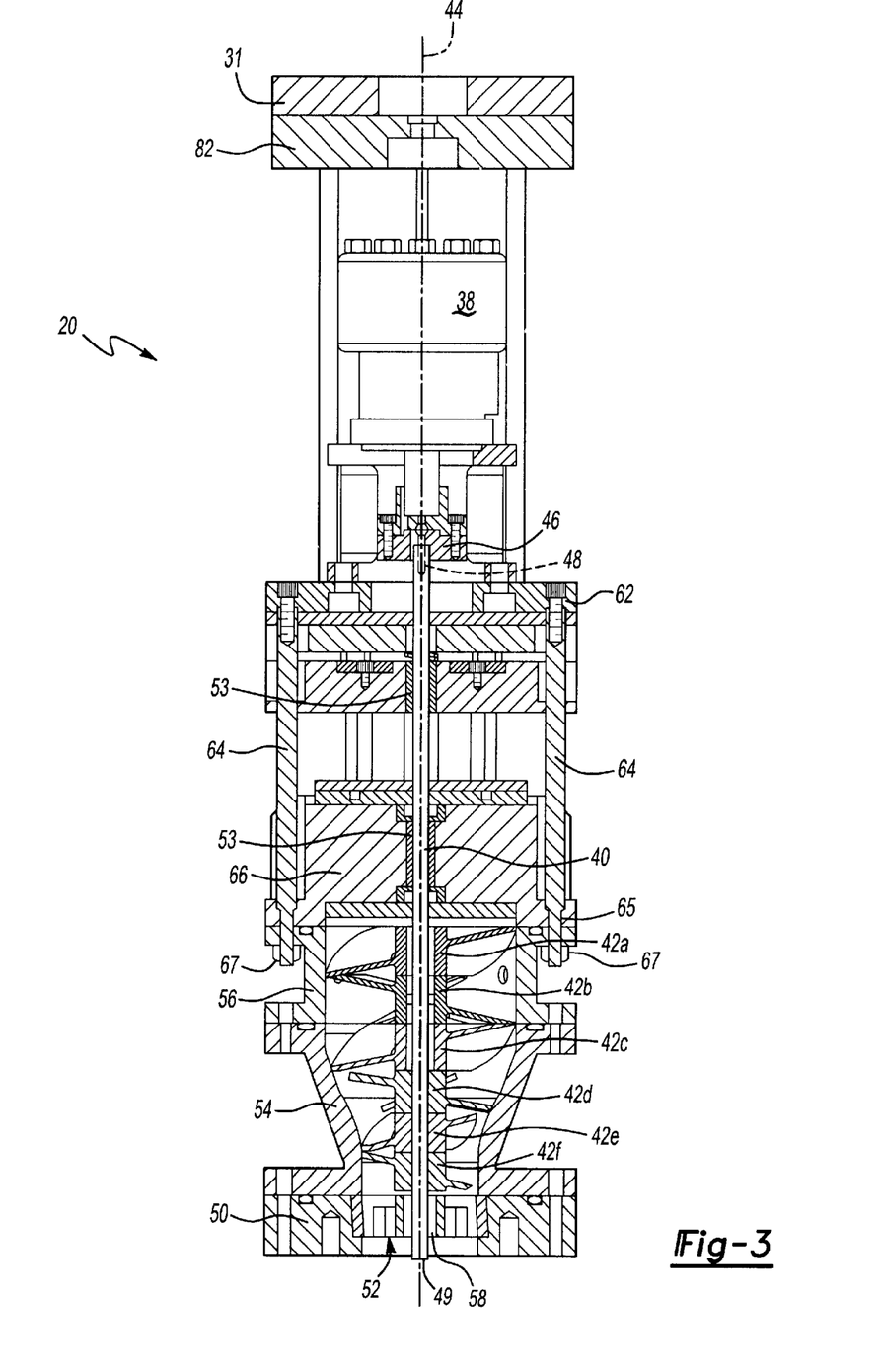
FIG. 3 is a sectional view of the mix head assembly taken along the line 3—3 in FIG. 2.
Figure 4:
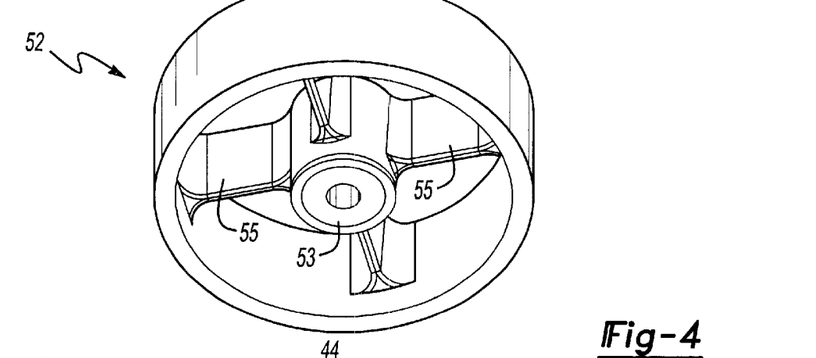
FIG. 4 is a perspective view of a third chamber portion located within the output assembly of the mix head assembly of FIG. 2.

Referring to FIG. 3, a sectional view taken along line 3—3 of FIG. 2 is illustrated. A drive motor 38 rotatably drives a main shaft 40 which propels a plurality of impellers 42A–42F. The drive shaft 40 is preferably located along a main axis 44 defined by the mix head assembly 20. A coupler 46 couples the drive shaft 40 to the drive motor 38 adjacent one end 48. The drive shaft 40 is rotatably retained along its length within bushings 53 and a bottom support 50 within a third chamber portion 52 adjacent an opposite end 49. The third chamber portion 52 retains the drive shaft within a bushing 53 and preferably includes a plurality of radially extending dividers 55 (FIG. 4). The dividers 55 provide a final flow disturbance as the fluid material exits the third chamber portion 52 to the mold assembly 22 (FIG. 1).

The impellers 42 (also illustrated in FIG. 5) rotate within the output chamber assembly 26. The output chamber assembly 26 contains impellers 42C–42F. It should be understood that a particular number of chamber portions are illustrated in the disclosed embodiment other output chambers of various configurations will also benefit from the present invention. The first chamber portion 56 is preferably substantially cylindrical and contains the impeller 42A and 42B. Impeller 42A is preferably a three (3) bladed 7.7 diameter left hand impeller having a pitch ratio of approximately 1:1. Impeller 42B is preferably a three (3) bladed 7.7 diameter right hand impeller having a pitch ratio of approximately 1:1. Preferably, impellers 42A and 42B are rotationally offset along drive shaft 40 by approximately 180 degrees.

The second chamber portion 54 is located between the first chamber portion 56 and the third chamber portion 52. It should be understood that although the output chamber assembly 26 includes a plurality of potions in the disclosed embodiment, other configurations will benefit from the present invention. The second chamber portion 54 preferably reduces diameter of the fluid material exit 58 by approximately three-fifths from the substantially cylindrical material exit located through the first chamber portion 56 and the third chamber portion 52. By providing an increased inner diameter of the third chamber portion 52 relative to the inner diameter of the second chamber portion 54 and the inner diameter of the first chamber portion 56, the fluid material is initially decelerated within the output chamber assembly 26 to provide additional mixing time to thoroughly mix the fluid materials with the impellers 42. Further, by contouring the inner diameter of the second chamber portion 54 relative to the inner diameter of the third chamber portion 52 and the inner diameter of the first chamber portion 56, the exit velocity of the fluid material is increased due in part to the Bernoulli effect created thereby.

Impeller 42C is preferably a three (3) bladed 6.0 diameter left hand impeller having a pitch ratio of approximately 1:1. Impeller 42D (FIG. 5) is preferably a three (3) bladed 5.0 diameter right hand impeller having a pitch ratio of approximately 1:1. Impeller 42E is preferably a three (3) bladed 4.0 diameter left hand impeller having a pitch ratio of approximately 1:1.5. Impeller 42F is preferably a three (3) bladed 4.0 diameter right hand impeller having a pitch ratio of approximately 1:1.

Preferably, impeller 42C is rotationally offset along the drive shaft 40 by approximately 180 degrees from impeller 42B. Impeller 42D is rotationally offset along the drive shaft 40 by approximately 180 degrees from impeller 42C. Impeller 42E is rotationally offset along the drive shaft 40 by approximately 180 degrees from impeller 42D. Impeller 42F is rotationally offset along the drive shaft 40 by approximately 180 degrees from impeller 42E. Each impeller 42 also preferably includes an aperture 43 through at least one blade. As will be further described below, an extremely thorough mixture of the fluid material is thereby assured as the fluid material passes through the first chamber portion 56, second chamber portion 54 and out through the third chamber portion 52.

Figure 6:
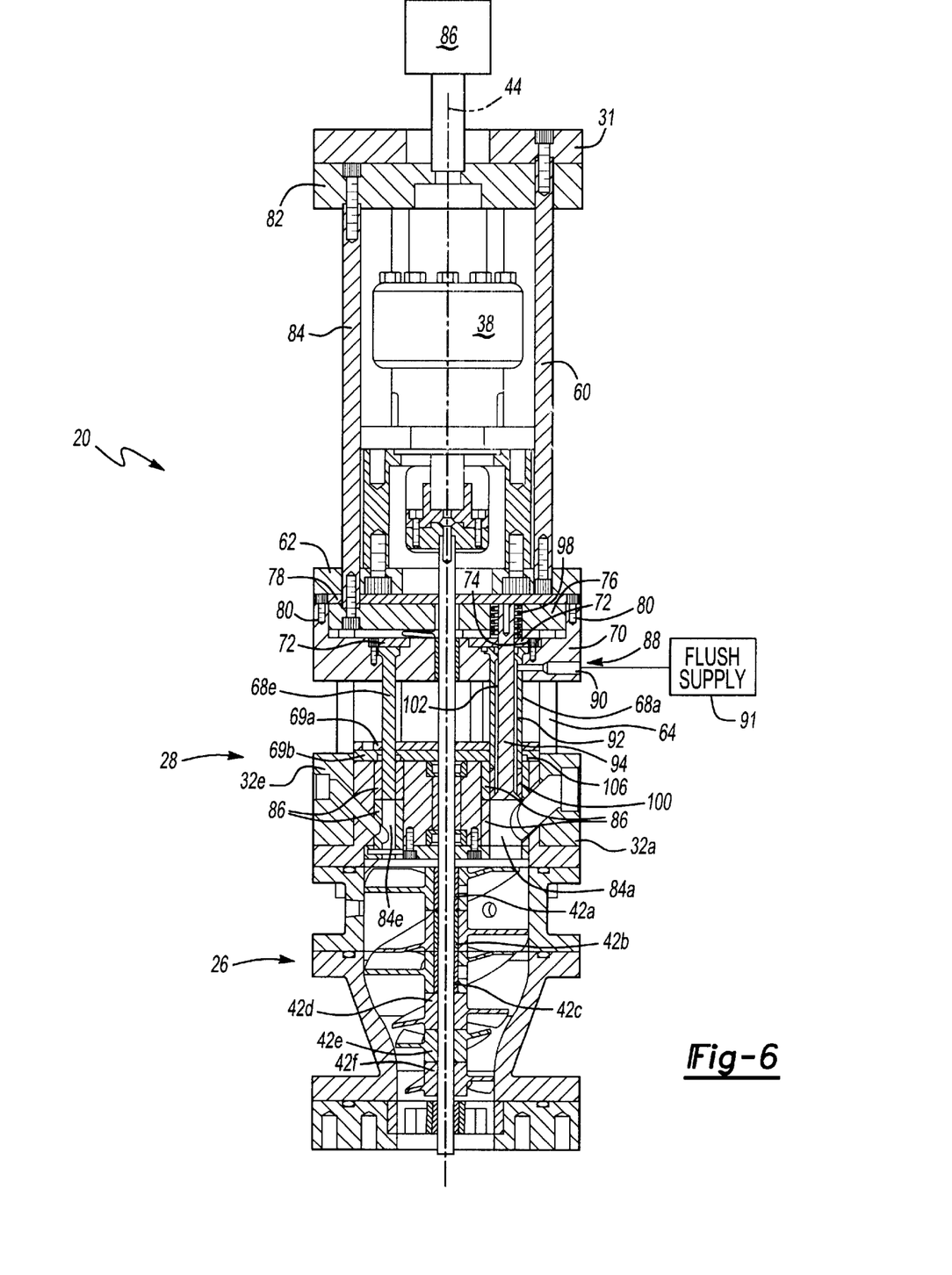
FIG. 6 is a sectional view of the mix head assembly taken along the line 6—6 in FIG. 2.

Referring to FIG. 6, a sectional view taken along line 6—6 of FIG. 2 is illustrated. The main body assembly 28 preferably mounts the input ports 32A–E of which only input ports 32A and 32E are illustrated in the sectional view of FIG. 6. A plurality of mounting rods 60 are attached between the mounting plate 31 and a motor mount 62 to rigidly retain the drive motor 38 and main body assembly 28. The main body assembly 28 is mounted to the motor mount 62 through a plurality of guide posts 64 (FIG. 3). The guide posts 64 extend from the motor mount 62, pass through an aperture 65 in the main body portion 66, and are attached to the first chamber portion 56 by fasteners 67 (FIG. 3).

Figure 6A:
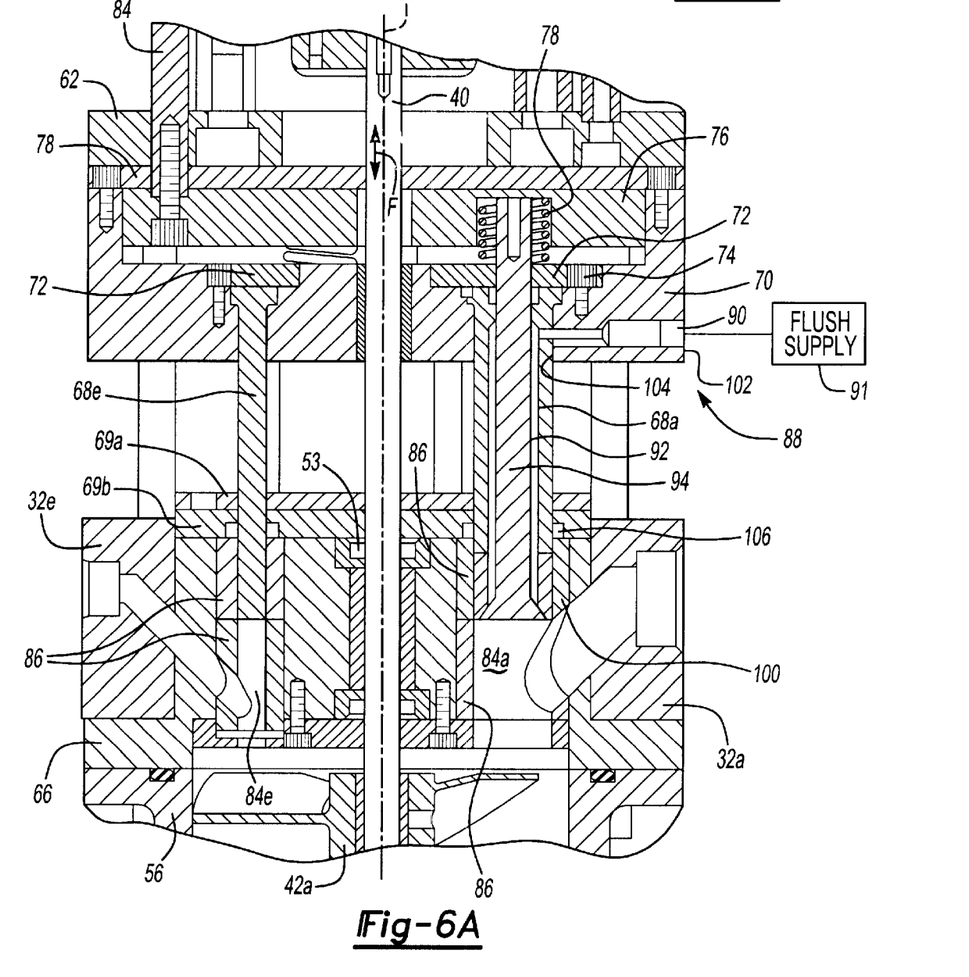
FIG. 6A is an expanded sectional view of main body of the mix head assembly of FIG. 6.
Figure 6B:
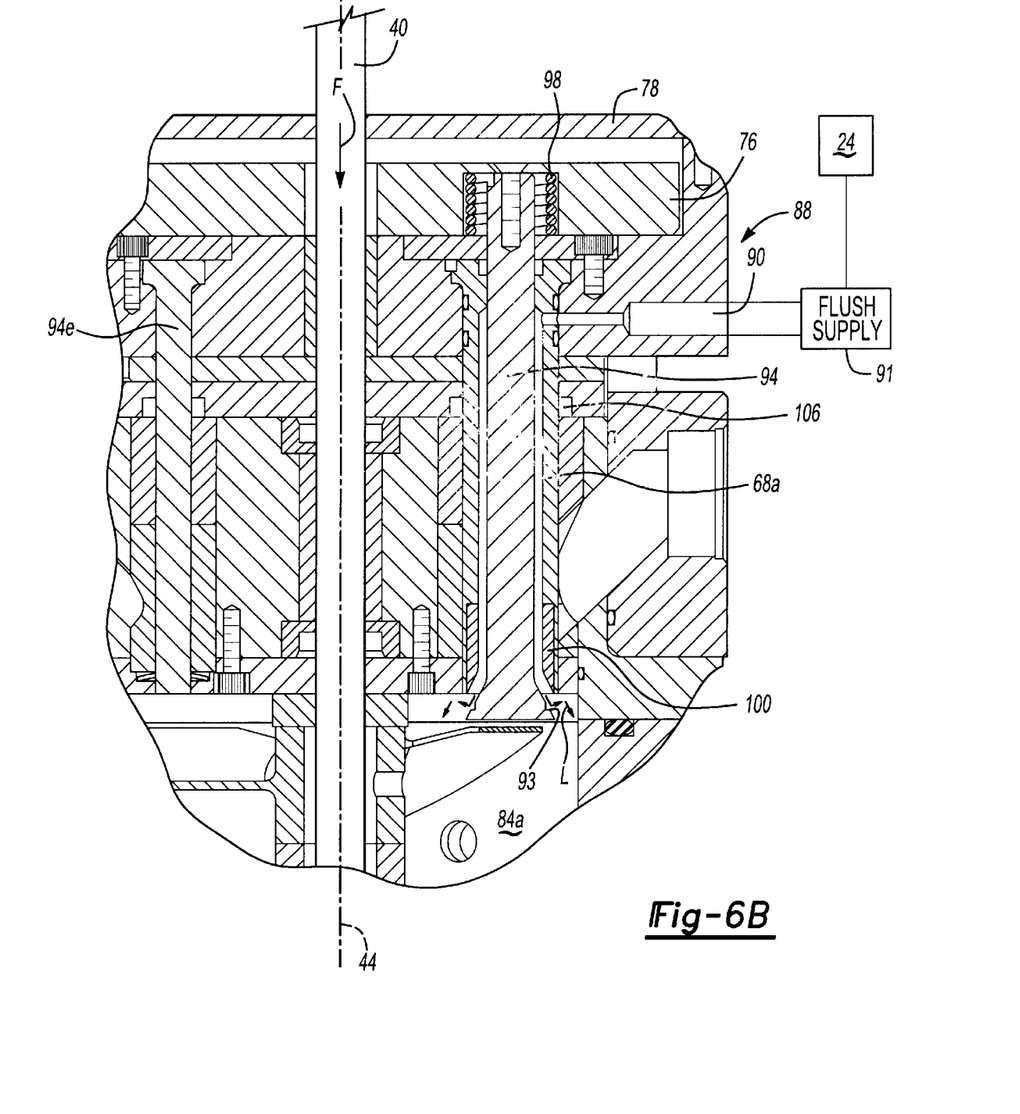
FIG. 6B is an expanded sectional view of main body of the mix head assembly of FIG. 6 illustrating the flush pin in an actuated position.
Figure 6C:
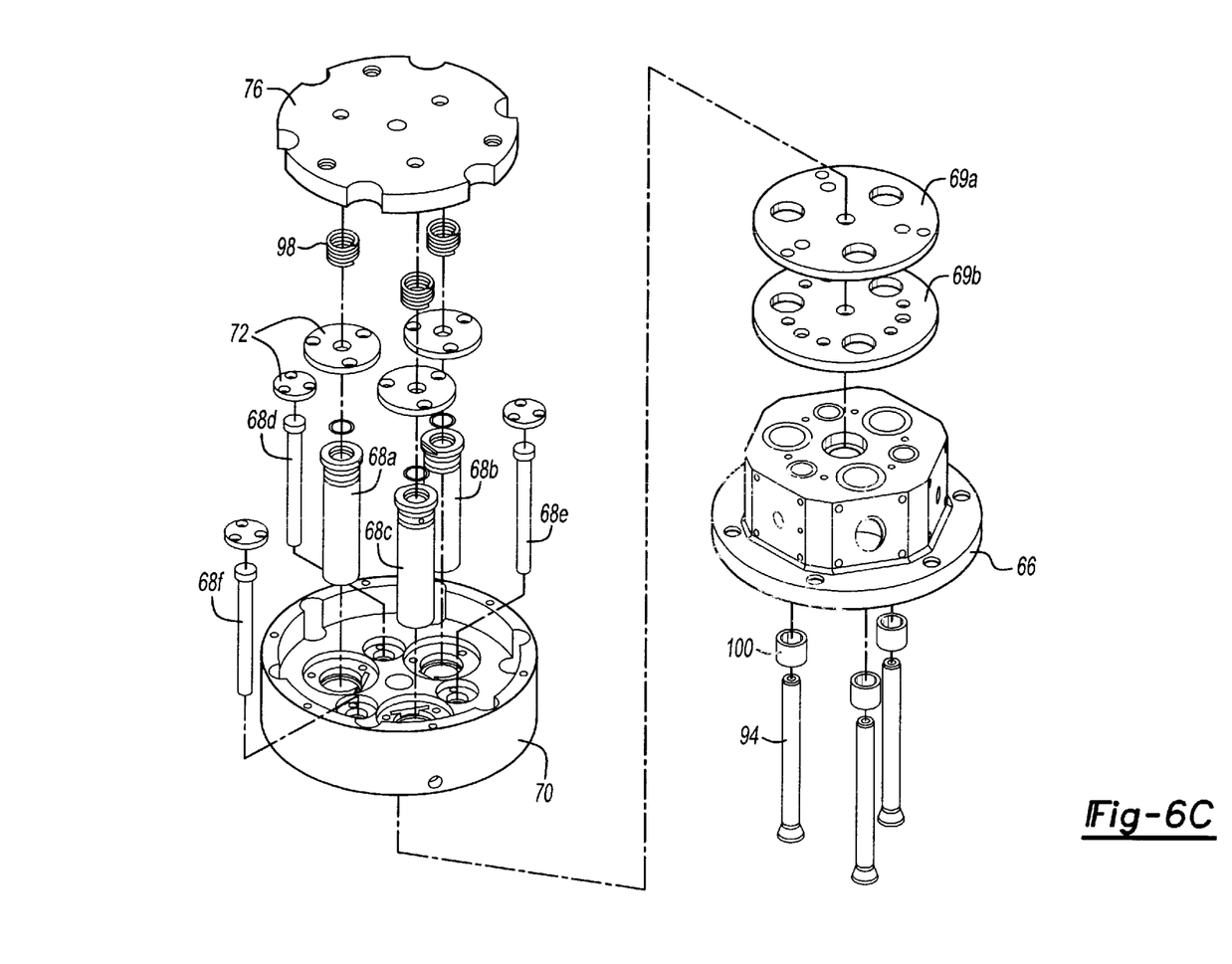
FIG. 6C is an exploded perspective view of the main body assembly of the mixing head assembly.

Referring also to FIGS. 6A and 6B, each input port 32A–32F includes a moveable gate 68A–68F to open and close fluid material flow through the input ports 32A–32C. The gates 68A–68F are mounted to a retaining block 70 by a removable cover 72. The removable cover 72 is retained within the retaining block 70 be a fastener 74 or the like. The gates 68A–68F can thereby be removed for maintenance or replacement by removing the cover 72. Cover plates 69A, 69B are preferably attached to the main body portion 66 to further guide and seal the gates 68A–68F which are movable therethrough.

A flush actuator plate 76 is retained within the retaining block 70 by a flush activating plate cover 78 such that the flush actuator plate 76 is movable in the direction of double headed arrow F along main axis 44. Flush actuator plate cover 78 is attached to the retaining block 70 by fasteners 80 or the like. The flush actuator plate 76 is mounted to a flush push plate 82 by a plurality of flush actuator rods 84. The flush actuator rods 84 remotely drive the flush actuator plate 76 in the direction of double headed arrow F along main axis 44 by an actuator (illustrated schematically at 86) attached to the flush push plate 82.

The retaining block 70 drives the gates 68A–68F within respective feed chambers 84A–84F of which only feed chambers 84A and 84E are illustrated in the sectional view of FIG. 6. Notably, feed chambers 84A–84F are in communication with each input port 32A–32F such that gates 68A–68F selectively provide or prevent communication from each input port 32A–32F to the output chamber assembly 26 and impellers 42A–42F. Bushings 86 of such bushing material as Teflon, brass, bronze, or the like preferably line the feed chambers 84A–84F to minimize resistance of the gates 68A–68F.

Preferably, the mix head assembly 20 include a flush assembly 88. The flush assembly 88 includes a flush input 90 which communicates a flushing fluid from a supply (illustrated schematically at 91) through the gates 68A–68C and into the feed chambers 84A–84C to thereby minimize residual fluid material after each molding cycle. In the disclosed embodiment, a flush input 90 (FIG. 2) is provided to input port 32A–32C, however, only the flush input 90 to feed chambers 84A is illustrated in the sectional view of FIG. 6. It should also be realized that although only inputs 32A–32C are provided with flush assemblies 88, each input port 32A–32F may be provided with independent flush assemblies 88 typically depending on the type of material which flows through the particular input port.

The flush input 90 communicates with a flush bore 92 located axially through gate 68A. A flush pin 94 is movably located within the flush bore 92 such that the flush pin 94 selectively provide or prevents communication from the flush input 90 into the feed chamber 84A. The flush pin 94 is attached to the flush actuator plate 76 by a fastener 96 or the like. A spring 98 is preferably located about the gate 68A to act upon the retaining block 70 and the flush actuator plate 76 to provide a force in the direction of arrow S and assure a seal between the flush pin 94 and the head 100 of the gate 68A. Seals 102 such as O-rings or the like fit within grooves 104 in the gate 68A to minimize leakage between the gate 68A and retainer block 70 as the flushing fluid travels from the flush input 90 to the flush bore 92. Gate seals 106 are also preferably located adjacent the gates 68A–68F to minimize leakage around the gates 68A–68F.

In operation, actuator 86 drives the flush push plate 82 and attached flush actuator rods 84 remotely drive the flush actuator plate 76 toward the retaining block 70 (FIG. 6B). As the flush actuator plate 76 is being driven toward the retaining block 70, the flush actuator plate 76 overcomes spring 98 such that the flush pin 94 extends from the gate 68A. As flush pin 94 extends from the head 100 of the gate 68A, the flush bore 92 opens to the feed chamber 84A. A complete communication path for a flushing fluid (schematically illustrated by arrows L) or the like is thereby created from the flush input 90, through the flush bore 92, and into the feed chamber 84. A flush directional groove 93 is preferably circumferentially arranged about the flush pin 94 to direct the flushing fluid L (FIG. 6B) toward the head 100 to improve flushing of the feed chamber 84A. Although the flush fluid path is opened in response to operation of the flush actuator plate 76 it should be realized that the flushing fluid can be selectively injected into the flush input 90 under control of the controller 24 (FIG. 1).

Further movement of the flush actuator rods 84, remotely drives the flush actuator plate 76 against the retaining block 70. Retaining block 70 and gates 68A–68F are thereby driven as a complete unit in the direction of arrow F such that the gates 68A–68F selectively block feed chamber 84A-84C. As each gate 68A–68F is fixed in the retaining block 70, the gates 68A–68F operate in unison to assure that that the input ports 32A–32F are opened and closed substantially simultaneously.

Figure 5:
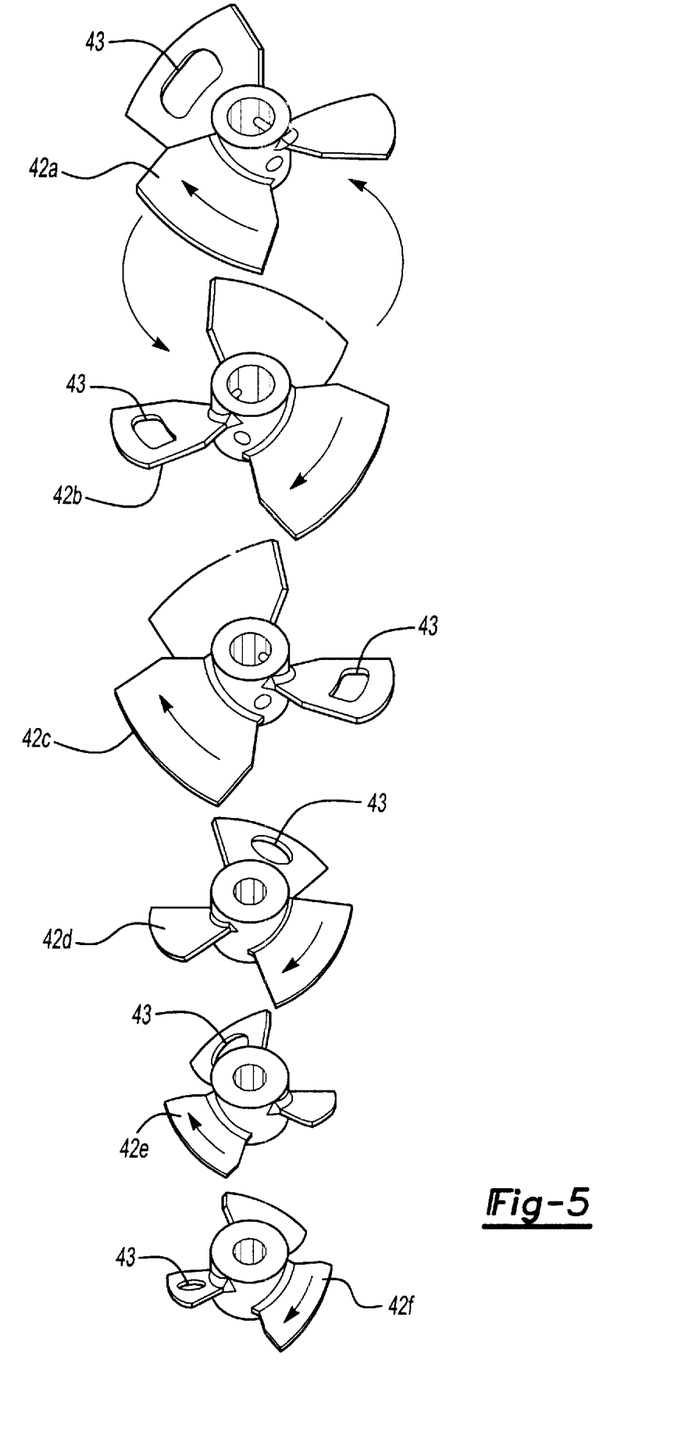
FIG. 5 is an exploded perspective view of one impeller of the mix head of FIG. 2.

As the fluid material from each fluid material supply 12A, 12B and 12C (FIG. 1) exit the respective feed chambers 84A–84C, the fluid material encounter impeller 42A (also illustrated in FIG. 5). Preferably, impeller 42A is driven by the drive shaft 40 such that impeller 42A drives the fluid materials back toward the feed chambers 84A–84C. Highly effective mixing of the fluid materials is provided as the fluid materials are driven back into the streams of fluid materials from the feed chambers 84A–84C.

The next impeller 42 which the fluid material flow encounters is impeller 42B. Impeller 42B preferably has an opposite pitch such that impeller 42B drives the fluid material toward impeller 42C. Impeller 42C drives the fluid materials back toward impeller 42B to again directs the fluid materials back toward the flow of fluid materials from the feed chambers 84A–84C.

Sequentially alternating between this "with stream" and "against stream" impeller 42 drive orientation (FIG. 5) preferably continues until impeller 42F drives the fluid materials out through the through the third chamber portion 52. The fluid materials are thereby thoroughly mixed during this "with stream" and "against stream" operation until the highly mixed fluid materials exit through the third chamber portion 52. In addition, the apertures 43 in each impeller 42 further assist in thoroughly mix the fluid materials by creating further turbulence within the output chamber assembly 26. As the fluid materials exit through the third chamber portion 52, the dividers 55 (FIG. 4) provide a fluid material flow disturbance to the fluid materials.

As mentioned above, the present invention is particularly useful for smashing or cracking a protective coating on glass fibers including in a polymer matrix that is supplied to at least one, and preferably several, of the supply parts. The inventive arrangement of impellers ensures the coatings are smashed or cracked such that the fiber will be exposed as they move into the mold. Accordingly, the present invention provides a highly effective mix head assembly that thoroughly mixes a multiple of fluid material components while using only a single drive motor. The present invention further assure that any coated component such as a silene coated fiberglass matrix is sufficiently cracked by the mix head to allow effective coating and mixing of the fiberglass matrix with the other fluid components.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. A mix head assembly for a molding machine comprising:
   a plurality of input ports;
   an output chamber assembly, said plurality of input ports communicating with said output chamber assembly;
   a drive assembly including a plurality of impellers driveable within said output chamber assembly about a main axis;
   a plurality of gates mounted to a movable retaining block, each of said plurality of gates are substantially simultaneously movable in response to movement of said movable retaining block to selectively permit and prevent a flow of fluid material from said plurality of input ports to said output chamber assembly, said plurality of gates movable parallel to said main axis in response to movement of said retaining block;
   at least one of said plurality of gates comprising a flush assembly, said flush assembly comprising a flush actuator plate movably retained to said movable retaining block; and
   a flush pin mounted substantially coaxially with at least one of said plurality of gates, said flush pin resiliently mounted to said flush actuator plate and driveable in response to movement of said flush actuator plate.

2. The system as recited in claim 1, wherein a fluid material is movable through said output chamber assembly in a substantially first direction.

3. The system as recited in claim 2, wherein at least one of said plurality of impellers is shaped to drive said fluid material in a second direction in relation to said first direction.

4. The system as recited in claim 2, wherein at least one of said plurality of impellers drives said fluid material in substantially said first direction.

5. The system as recited in claim 2, wherein a plurality of impellers are shaped to sequentially drive said fluid material in substantially said first direction and in a direction substantially opposite said first direction.

6. The system as recited in claim 1, wherein each of said plurality of impellers are driven by a common drive shaft.

7. The system as recited in claim 1, wherein at least one of said plurality of impellers includes at least one aperture through at least one blade of said at least one of said plurality of impellers.

8. The system as recited in claim 7, wherein each of said plurality of impellers includes an aperture.

9. The system as recited in claim 1, wherein said output chamber assembly includes a first chamber portion, a secondary chamber portion, and a tertiary chamber portion.

10. The system as recited in claim 1, wherein said output chamber assembly includes a first chamber portion, a secondary chamber portion, and a tertiary chamber portion, said first chamber portion having a first inner volume and said tertiary chamber having a second inner volume, said secondary chamber located between said first chamber portion and said tertiary chamber.

11. The system as recited in claim 10, wherein said tertiary chamber portion includes a plurality of radially extending dividers.

12. The system as recited in claim 1, wherein said output chamber assembly includes a first chamber portion, a secondary chamber portion, and a tertiary chamber portion, said first chamber portion having a first inner volume, and said tertiary chamber having a second inner volume less than said first inner volume.

13. The system as recited in claim 12, wherein said secondary chamber portion is located between said first chamber portion and said tertiary chamber, said secondary chamber portion contoured to reduce an intermediate inner portion of said output chamber assembly from said first inner volume to said second inner volume.

14. The mix head assembly as recited in claim 1, wherein said flow of fluid material from said plurality of input ports to said output chamber assembly travels parallel to the main axis and exits said output chamber assembly parallel to said main axis.

15. The mix head assembly as recited in claim 14, wherein said flow of fluid material from each of said plurality of input ports to said output chamber assembly is selectively prevented by one of said plurality of gates which moves parallel to said main axis to shear said flow of fluid material.

16. A molding machine comprising:
    a plurality of fluid material supplies;
    a feed assembly communicating with each of said plurality of fluid material supplies to receive each of a plurality of fluid materials from each of said plurality of fluid material supplies;
    a mix head assembly including a plurality of input ports, each of said input ports connected to said feed assembly to receive each of said plurality of fluid materials from said feed assembly;
    an output chamber assembly, said plurality of input ports communicating with said output chamber assembly, said plurality of fluid materials movable through said output chamber assembly in a substantially first direction;
    a drive assembly including a plurality of impellers driveable within said output chamber assembly about a main axis, at least one of said plurality of impellers being shaped to drive said fluid material in a second direction in relation to said first direction;
    a plurality of gates mounted to a movable retaining block, each of said plurality of gates movable to selectively permit and prevent a flow of fluid material from said plurality of input ports to said output chamber assembly, said plurality of gates movable parallel to said main axis in response to movement of said retaining block along the main axis;
    at least one of said plurality of gates comprising a flush assembly, said flush assembly comprising a flush actuator plate movably retained to said movable retaining block; and
    a flush pin mounted substantially coaxially with at least one of said plurality of gates, said flush pin resiliently mounted to said flush actuator plate and driveable in response to movement of said flush actuator plate.

17. The system as recited in claim 16, wherein a plurality of impellers sequentially drives said fluid material in substantially said first direction and said second direction.

18. The system as recited in claim 17, wherein said second direction is substantially opposite said first direction.

19. The system as recited in claim 16, wherein at least one of said plurality of impellers includes at least one aperture through at least one blade of said at least one of said plurality of impellers.

20. The system as recited in claim 19, wherein each of said plurality of impellers includes an aperture.

21. The system as recited in claim 16, wherein at least one of said plurality of gates includes a flush assembly having a flush pin mounted coaxially with one of said plurality of gates.

22. The molding machine as recited in claim 16, wherein said flow of fluid material from said plurality of input ports to said output chamber assembly travels parallel to the main axis and exits said output chamber assembly parallel to said main axis.

23. The molding machine as recited in claim 22, wherein said flow of fluid material from each of said plurality of input ports to said output chamber assembly is selectively prevented by one of said plurality of gates which moves parallel to said main axis to shear said flow of fluid material.

24. A mix head assembly for a molding machine comprising:
    a plurality of input ports;
    an output chamber assembly, said plurality of input ports communicating with said output chamber assembly;
    a drive assembly including a plurality of impellers driveable within said output chamber assembly about a main axis such that a flow of fluid material from said plurality of input ports to said output chamber assembly travels parallel to the main axis and exits said output chamber assembly parallel to said main axis;
    a plurality of gates mounted to a movable retaining block, each of said plurality of gates are substantially simultaneously movable in response to movement of said movable retaining block to selectively permit and prevent a flow of fluid material from said plurality of input ports to said output assembly, at least one of said plurality of gates comprising a flush assembly, said flush assembly comprising a flush actuator plate movably retained to said movable retaining block; and
    a flush pin mounted substantially coaxially with at least one of said plurality of gates, said flush pin mounted substantially coaxially with at least one of said plurality of gates, said flush pin resiliently mounted to said flush actuator plate and driveable in response to movement of said flush actuator plate.

25. The mix head assembly as recited in claim 24, wherein said plurality of impellers are shaped to alternatively drive said fluid material in a substantially first direction and in a direction substantially opposite said first direction.

26. The mix head assembly as recited in claim 24, wherein at least one of said plurality of impellers includes at least one aperture through at least one blade of said at least one of said plurality of impellers.

27. The mix head assembly as recited in claim 24, wherein said output chamber assembly includes a first chamber portion, a secondary chamber portion, and a tertiary chamber portion, said first chamber portion having a first substantially cylindrical inner portion, and said tertiary chamber having a second substantially cylindrical inner portion defining a second volume less than a first volume defined by said first substantially cylindrical inner portion.

28. The mix head assembly as recited in claim 27, wherein said secondary chamber potion is located between said first chamber portion and said tertiary chamber, said secondary chamber portion contoured to reduce an intermediate inner portion of said output chamber assembly from said first substantially cylindrical inner portion to said second substantially cylindrical inner portion.

29. The mix head assembly as recited in claim 28, wherein said tertiary chamber portion includes a plurality of radially extending dividers.

* * * * *